No. 894,818. PATENTED AUG. 4, 1908.
J. R. CRAIG, Jr.
ELECTRODE FOR THE EVOLUTION OF OZONE FROM OXYGEN
OR ATMOSPHERIC AIR.
APPLICATION FILED APR. 6, 1908.
2 SHEETS—SHEET 1.
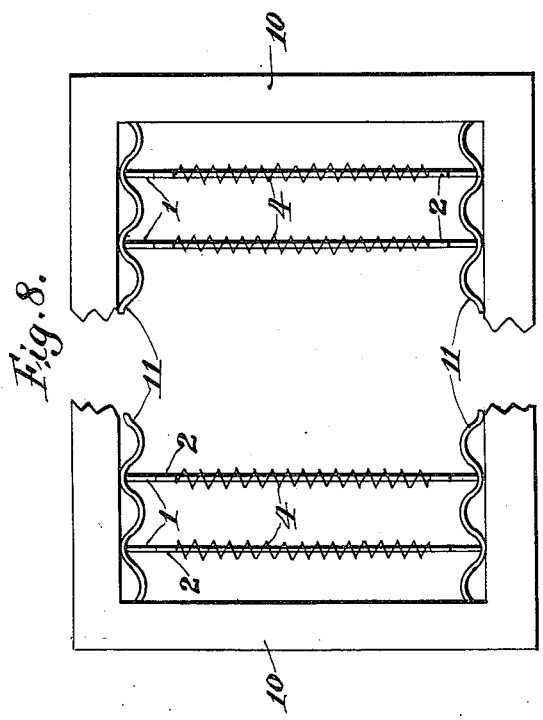
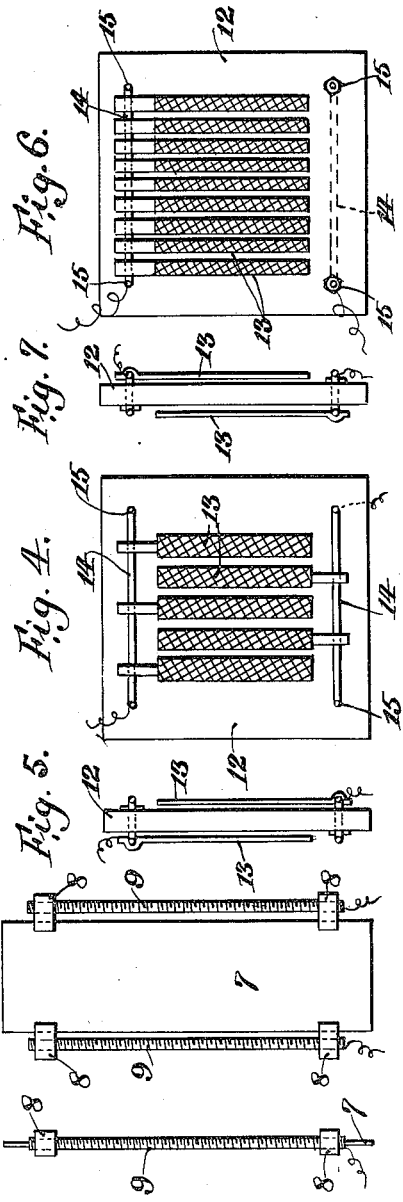
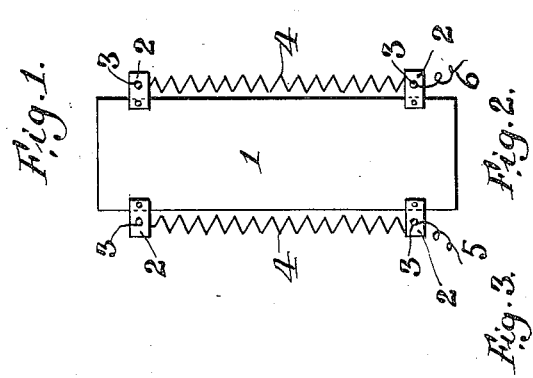
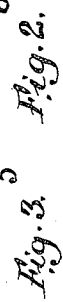
WITNESSES:
Ella M. Ware
INVENTOR
John Richardson Craig, Jr.
BY
Walter C. Pusey
ATTORNEY.

No. 894,818.
J. R. CRAIG, Jr.
PATENTED AUG. 4, 1908.
ELECTRODE FOR THE EVOLUTION OF OZONE FROM OXYGEN OR ATMOSPHERIC AIR.
APPLICATION FILED APR. 6, 1908.
2 SHEETS—SHEET 2.
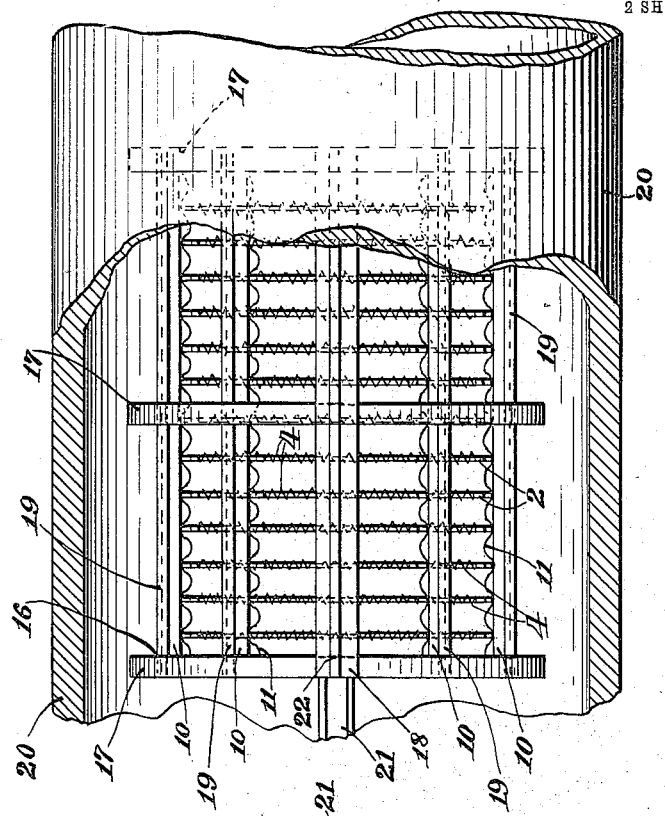
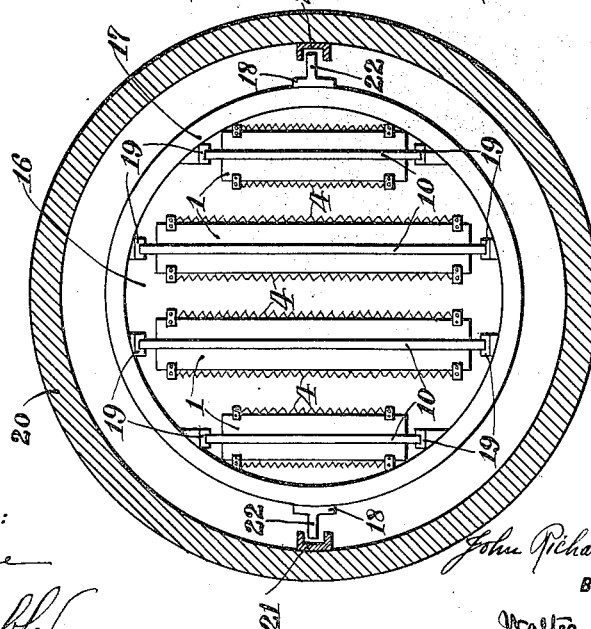
WITNESSES:
INVENTOR
ATTORNEY.

UNITED STATES PATENT OFFICE.

JOHN RICHARDSON CRAIG, JR., OF GLASGOW, SCOTLAND.

ELECTRODE FOR THE EVOLUTION OF OZONE FROM OXYGEN OR ATMOSPHERIC AIR.

No. 894,818.  Specification of Letters Patent.  Patented Aug. 4, 1908.

Application filed April 6, 1908. Serial No. 425,382.

*To all whom it may concern:*

Be it known that I, JOHN RICHARDSON CRAIG, Jr., subject of the King of Great Britain, and resident of Glasgow, Scotland, have invented certain new and useful Improvements in Electrodes for the Evolution of Ozone from Oxygen or Atmospheric Air, of which the following is a full, clear, and exact description, reference being had to the accompanying drawings.

This invention relates to electrodes for the evolution of ozone from oxygen or atmospheric air, by the silent discharge of high tension electric current.

The object of the invention is, first, to provide a simple and efficient electrode unit and combination of electrode units forming a compound electrode, for the discharge of the electric current, whereby the extent or amount of discharging surface desired to be exposed in one of the compound electrodes may be regulated from the minimum to the maximum; secondly, a simple and efficient means for assembling a number of electrode units in proper relation to each other within a frame in a manner to permit the ready application or removal of the electrode units to or from the frame; thirdly, a simple and efficient means of assembling together a number of electrode frames within a cage or receptacle, in a manner to permit air to pass through the cage or receptacle and to be acted upon by the electric current discharged from the electrode units; and also in a manner to permit each individual frame to be readily applied to or removed from the cage or receptacle; fourthly, to provide a simple and efficient means for supporting the receptacle or cage within an air-passageway, in a manner to permit the receptacle to be readily introduced to or removed from the passageway.

The invention consists in the novel construction and combinations of parts which will be hereinafter fully described and claimed.

In the drawings:—Figure 1 is an elevation of one form of electrode embodying my invention. Fig. 2 is an elevation of another form of electrode embodying my invention. Fig. 3 is an edge view of Fig. 2. Fig. 4 is an elevation of another form of electrode embodying my invention. Fig. 5 is an edge view thereof. Fig. 6 is an elevation of another form, and Fig. 7, an edge view thereof. Fig. 8 is an elevation of a frame for carrying a plurality of electrodes or electrode units such as shown in Figs. 1, 2, and 3. Fig. 9 is an end view of an air pipe or passage way having, suitably supported therein, a cage carrying a number of frames provided with electrodes all embodying my invention. Fig. 10 is a side elevation of Fig. 9, partly broken away.

The electrode or electrode unit shown in Fig. 1, consists of a strip of micanite, or other similar di-electric medium 1 on each side edge of which, near the top and near the bottom thereof, is provided a metal projection 2, having an eye 3 therein, said projection being suitably secured to the di-electric medium, as shown. Arranged on the respective sides of the di-electric medium are metal springs 4, which are stretched between the projections 2, and engaged therewith, the ends of the springs being provided with hooks which are engaged with the eyes 3. The two opposed metal projections 2 are connected to wires 5 and 6, which in turn are adapted to be connected to the high tension terminals of an induction coil or alternating current transformer. Thus it will be seen that the springs 4, when charging and discharging the di-electric medium, will vibrate synchronously with the interruptions or cycles of the high tension current. The projections 2 must be arranged far enough apart to prevent a spark bridging the air gap between them.

When the highest efficiency is not absolutely necessary, and when it is desired to have a discharge which will be practically noiseless, the springs 4 are dispensed with, and I employ an electrode or an electrode unit such as is shown in Figs. 2 and 3. In this construction, I employ a dielectric medium 7, similar in shape and size to the di-electric medium 1.shown in Fig. 1, and I secure to the di-electric medium 7 metal clips 8, arranged similarly to the metal projections 2 in Fig. 1. Arranged on the respective sides of the dielectric medium 7, and extending between the metal clips 8, are threaded metal wires 9, or their equivalents, having their ends inserted in the said clips. Instead of using the threaded metal wires 9, thin strips of metallic gauze or the like may be employed.

In Fig. 8 is shown a complete or compound electrode, employing a number of individual electrode units such as shown in Fig. 1. The construction shown in this figure comprises a light metal rectangular frame 10, the inner sides of the top and bottom bars of which are provided with corrugated metal strips 11, or their equivalent. The corrugations of the metal strips 11 form oppositely disposed grooves into which are inserted in parallel relation to each other, a number of electrodes such as is shown in Fig. 1, these electrodes appearing in edge view in Fig. 8.

The frame 10 may be filled with electrodes such as that shown in Fig. 1, or it may be filled with electrodes such as that shown in Figs. 2 and 3; or it may be filled with both forms of electrodes, shown in Fig. 1 and Figs. 2 and 3, used collectively.

In the constructions shown in Figs. 4, 5, 6, and 7, the di-electric medium 12, is a sheet of glass or the like. The metallic discharging units, 13, may be clipped, stretched, or suspended on the flat surface of the glass, to which a strip or rod 14 is fitted on one or both sides of the glass sheet, preferably at the top and bottom. The glass may be bored near the four corners, to take screw pins 15 having nuts or the like to hold the rods in position; or the rods may be clamped at the outside edges of the glass sheet to save boring the latter. In this construction the metallic dischargers 13, which may be conveniently constructed of metal gauze fixed to spring wire carriers having suitable clips, may be arranged alternately on the top and bottom bars 14, such arrangement providing for the charging and discharging of the di-electric by live units of opposite sign on one and the same side of the di-electric sheet, as also on opposite sides.

To carry a battery of electrodes, I use a metallic frame or cage 16, shown in Figs. 9 and 10, consisting of metal hoops 17, held together on the outside by two oppositely disposed, T-iron bars 18. The hoops 17 are held together on the inside thereof by longitudinally-arranged and oppositely-disposed, channel iron bars 19, which extend the length of the frame or cage and are secured to the hoops 17 thereof in any convenient manner. These channel bars 19 are adapted to receive the upper and lower edges of the electrodes of any one of the forms of electrodes shown in Figs. 4, 5, 6, 7, and 8. In Figs. 9 and 10, I have shown the frame or cage provided with electrodes such as is shown in Fig. 8. Thus it will be seen that the channel irons 19 form receptacles for the electrodes or units of the battery, which units are thereby rendered accessible for the removal or addition of the metallic dischargers, as may be required for altering the capacity of the electrodes.

The frame 16 is designed to be inserted in a cylindrical air passageway 20, (Figs. 9 and 10). The opposite interior side walls of the air passageway 20 are provided with oppositely-disposed channel bars 21, extending longitudinally of the passageway, and arranged for the reception of the projecting ribs 22 of the T-iron bars 18 of the frame 16, whereby the frame 16 may be readily inserted in or removed from the air passageway 20. Thus it will be seen that air, in passing through the passageway 20, will be acted upon by the electrodes in its path, for the production of ozone.

It is obvious that the invention is capable of considerable modification in regard to details such as the formation of the dischargers, but one of the essential features of the invention is the provision of electrodes capable of being built up in sections, the metallic discharging medium being detachable in units, the latter being positioned in such a manner that a delicate or thin di-electric supporting them may be protected from injury by an electrical discharge, such dielectric being the only insulator used within a metal electrode-frame or carrier.

By the construction hereinbefore described, I am enabled to divide the di-electric or inductive medium, usually interposed between the discharging surfaces, into units equivalent in number to each pair of discharging surfaces, so that, as when mica or micanite is used, expense may be saved, warping avoided, and any damaged or defective unit removed without disturbing its neighbors, thus saving inconvenience of renewal and repair.

I have found that micanite (usually a composition of mica and shellac) interposed as a single sheet between discharging media, perishes and is pierced after being in use some little time, and occasionally large and expensive sheets have thus been practically destroyed. By arranging my complete electrodes in units, it is possible and convenient to fix or suspend the discharging surfaces on the edges of the di-electric medium, say at the vertical ends, instead of, as heretofore, on the flat surface, provided that the discharging surfaces are placed far enough apart to prevent sparking across in the air. The advantages of this arrangement are obvious, as it enables me to retain the use of micanite, which is a light and workable dielectric, but I may use any other suitable dielectric medium in units arranged on one compound electrode.

The discharging surfaces on each unit may be fitted or suspended in any convenient manner, but preferably will consist of a column of spiral wire, in the form of a spiral spring, having a convenient form of hook or other attachment at each end, as shown in Fig. 1, so that the spiral wire or spring may be attached to, or removed from, two supports on the di-electric, near to each end of the strip; the spiral being under tension between the two points of support. The units may be electrically connected in any convenient manner, and each di-electric medium or unit will be capable of being mounted on a metallic removable frame, so that any reasonable number of units may constitute the complete electrode.

Having thus described my invention, I claim as new and desire to secure by Letters Patent:—

1. An electrode for the purpose described, comprising a pair of discharging units for the electric current, a di-electric plate arranged edgewise between said units, and means for detachably securing the units to the plate, substantially as set forth.

2. An electrode for the purpose described, comprising a di-electric plate provided with projections on the opposite edges thereof, and discharging units for the electric current extending between the said projections, substantially as set forth.

3. An electrode for the purpose described, comprising a di-electric plate provided with projections on the opposite edges thereof, discharging units for the electric current extending between said projections, and means for detachably securing said units to said projections, substantially as set forth.

4. An electrode for the purpose described, comprising a pair of discharging units for the electric current each in the form of a coiled spring, a di-electric plate arranged edgewise between said units, and means for detachably securing the units to the plate, substantially as set forth.

5. An electrode for the purpose described comprising a di-electric plate provided with perforated projections on the opposite edges thereof, discharging units for the electric current extending between said projections, and provided with hooks in engagement with said projections, substantially as set forth.

6. An electrode for the purpose described, comprising a frame, a plurality of di-electric plates having their edges secured in the frame, and discharging units for the electric current secured to said plates, substantially as set forth.

7. An electrode for the purpose described, comprising a frame, a plurality of di-electric plates arranged within the frame, discharging units for the electric current secured to said plates, and said plates extending edgewise between said units, substantially as set forth.

8. An electrode for the purpose described, comprising a frame, a plurality of di-electric plates having their edges secured in the frame, discharging units for the electric current secured to said plates, and said plates extending edgewise between said units, substantially as set forth.

9. A plurality of electrodes for the purpose described, arranged in parallel relation to each other, and a frame for said electrodes including channel bars into which the electrodes are inserted, substantially as set forth.

10. A plurality of electrodes for the purpose described arranged in parallel relation to each other, and a frame comprising transversely-arranged rings and longitudinally-arranged channel bars into which the electrodes are inserted, substantially as set forth.

11. A plurality of electrodes for the purpose described arranged in parallel relation to each other, a frame into which the electrodes are inserted, oppositely disposed T-bars extending longitudinally of the frame, and an air passageway surrounding the frame and provided with oppositely disposed channel bars into which the ribs of said T-bars are inserted substantially as set forth.

In testimony whereof, I have hereunto affixed my signature.

JOHN RICHARDSON CRAIG, JR.

Witnesses:
ALFRED THOMAS BURBERG,
H. D. JAMESON.